United States Patent [19]

Patel

[11] Patent Number: 5,319,296

[45] Date of Patent: Jun. 7, 1994

[54] OSCILLATORY SERVO-VALVE MONITOR

[75] Inventor: Manubhai C. Patel, Renton, Wash.

[73] Assignee: Boeing Commercial Airplane Group, Seattle, Wash.

[21] Appl. No.: 787,168

[22] Filed: Nov. 4, 1991

[51] Int. Cl.$^5$ .................... G05B 5/01; B64C 13/00

[52] U.S. Cl. .................... 318/611; 318/638; 244/227

[58] Field of Search ........... 318/560, 565, 611, 623, 318/629, 638, 656, 657; 244/75 R, 76 R, 76 A, 78, 220, 221, 226, 227, 228

[56] References Cited

U.S. PATENT DOCUMENTS

| | | |
|---|---|---|
| 3,535,441 | 10/1970 | Grace . |
| 3,709,253 | 9/1975 | Spangenberg . |
| 3,908,935 | 3/1979 | Heintz . |
| 3,920,966 | 11/1975 | Knemeyer et al. . |
| 4,143,583 | 1/1980 | Bauer et al. . |
| 4,183,467 | 10/1984 | Sheraton et al. . |
| 4,198,021 | 4/1980 | Meredith et al. . |
| 4,475,086 | 4/1989 | Allen . |
| 4,566,101 | 1/1986 | Skonieczny et al. . |
| 4,590,764 | 5/1986 | Escobosa . |
| 4,635,214 | 1/1987 | Kasai et al. . |
| 4,706,902 | 11/1987 | Destuynder et al. . |
| 4,809,742 | 3/1989 | Grau .................... 137/554 |
| 4,821,769 | 4/1989 | Mills . |
| 4,825,375 | 4/1989 | Nadkarni et al. .................... 364/435 |
| 4,916,641 | 4/1990 | Bybee . |
| 4,953,590 | 9/1990 | Kakinuma et al. . |

Primary Examiner—Bentsu Ro

[57] ABSTRACT

An oscillatory servo-valve fault monitor is provided for identifying faults attributable to servo-control system components. In particular, both low frequency and high frequency (oscillatory) fault responses are identified. Such oscillatory fault responses are distinguished from normal position control adjustments and transient responses. As the reaction to a fault condition is to shut down the faulty actuator and corresponding servo-control, such capability avoids inadvertent shut-downs. Independent detection paths are provided for sensing low frequency responses and high frequency responses. Each path includes a respective window comparator and up-down counter. For a given path, the window comparator defines two thresholds—in effect, a window. If the monitored signal amplitude is outside the window, then a counter or count signal is incremented. If the signal amplitude is within the window, then the counter or count signal is decremented. The time constant for counting up is less than that for counting down, so that more up counts would occur in a given time period, than would down counts for the same period. As a result, faults causing an oscillatory amplitude beyond the thresholds of the window comparator are quickly identified. If the count signals (or the count in either of the up-down counters) exceed a respective value, then the monitor indicates that a fault condition is present.

15 Claims, 4 Drawing Sheets

OSCILLATORY SERVO-VALVE MONITOR

BACKGROUND OF THE INVENTION

This invention relates to a method and apparatus for detecting oscillatory faults in an aircraft flight control system. More particularly, this invention relates to a method and apparatus for detecting failures causing undesirable low frequency or high frequency (oscillatory) motion of an aerodynamic control-surface.

Commercial aircraft often include aerodynamic control surfaces. By altering the shape of such surfaces the flight response of the aircraft changes, enabling the pilot to alter the aircraft attitude. Typically, one or more sets of redundant actuators are coupled to a control surface to alter the surface displacement. The pilot or a primary flight computer issues commands which define actuator positions, and thus, the shape of an aerodynamic control-surface. Sensors monitor actuator positions and provide feedback signals to the primary flight computer enabling correction of actuator/surface position errors.

Faults occurring in an actuator control loop may result in undesirable oscillatory response of the actuator/surface. Typical faults leading to such oscillatory response include a worn actuator, high drift at an amplifier or a short-circuit in an electronic component. Other fault conditions also may cause oscillatory response. Such oscillation may fatigue the mechanical components (including the actuator), detract from aircraft ride quality and/or damage the aerodynamic control surface or other aircraft structure. Accordingly, there is a need to detect and correct such fault conditions.

As previously mentioned, an aircraft typically includes redundant actuators. Thus, in-flight correction involves shutting down the failed actuator and relying on the redundant actuator(s). Once on the ground the failed component is replaced.

A conventional oscillatory failure monitor is disclosed in U.S. Pat. No. 4,566,101 (Skonieczny et. al.). As disclosed therein, redundant sensors indicative of the same physical condition provide respective input signals to a monitor. When testing for fault conditions, the two input signals are compared to generate a difference signal which then is analyzed to determine if within a prescribed tolerance. For a transition of the difference signal from within-tolerance to out-of-tolerance an up-down counter is incremented. For a difference signal which stays within-tolerance for a prescribed time period, the up-down counter is decremented (not below a zero value). Thus, if an oscillatory fault occurs at one sensor causing the difference signal to go out-of-tolerance periodically, then the up-down counter increments (twice) for each oscillation period. To avoid registering transient errors as a fault condition, a fault is registered only when the up-down counter exceeds a prescribed count. One of the problems of such an approach is that the higher the oscillation frequency exhibited for a fault, the less the difference signal amplitude. This is because the amplitude for the oscillating (failed) sensor response typically decreases as frequency increases. Skonieczny et. al. describe a region 3 shown in their FIG. 3 in which faults are not detected even though beyond the relative threshold. Skonieczny et. al. recite that fault responses at such frequencies "may not be of concern". However, faults in such higher frequency region adversely impact aircraft ride quality and fatigue mechanical components. Accordingly, there is a need for a monitoring method and apparatus which detects both low frequency and high frequency fault conditions.

SUMMARY OF THE INVENTION

According to the invention, an oscillatory servo-valve fault monitor detects faults attributable to servo-control system components for a system which controls the shape of an aerodynamic control surface. In particular, both low frequency and high frequency (oscillatory) fault responses are identified. Such oscillatory fault responses are distinguished from normal position control adjustments and transient responses. As the reaction to a fault condition is to shut down the faulty actuator and corresponding servo-control, such capability avoids inadvertent shut-downs.

The servo-control system generates an actuator-position error feedback signal and with the servo-valve feedback signal which is input to the monitor. The monitor generates a servo-valve error signal which then is processed to identify low frequency and high frequency fault responses.

According to one aspect of the invention, independent low frequency and high frequency fault response paths receive the servo-valve error signal. The low frequency path includes a first dual-sided window comparator and a first up/down counter. The first dual-sided window comparator has a first threshold and a second threshold, the first being greater than the second. The high frequency path includes a band-pass filter, along with a second dual-sided window comparator and a second up/down counter. The second dual-sided window comparator has a third threshold and a fourth threshold, the third being greater than the fourth.

With regard to the low frequency path, a servo-valve error signal having an amplitude greater than the first threshold or less than the second threshold causes the first up-down counter to increment. A servo-valve error signal having an amplitude less than the first threshold and greater than the second threshold causes the first up-down counter to decrement. The two thresholds, in effect, define a window. If the error signal is outside the window, the first counter counts up. If the error signal is within the window, the first counter counts down. If the up-down counter counts above a prescribed level, then a low frequency fault condition is registered, causing a monitor status signal to indicate a failure.

With regard to the high frequency path, a servo-valve error signal having an amplitude greater than the third threshold or less than the fourth threshold causes the second up-down counter to increment. A servo-valve error signal having an amplitude less than the third threshold and greater than the fourth threshold causes the second up-down counter to decrement. Again, the two thresholds, in effect, define a window. If the error signal is outside the window, the second counter counts up. If the error signal is within the window, then the second counter counts down. The thresholds for the second up-down counter normally are different than those for the first up-down counter. If the second up-down counter counts above a prescribed level, then a high frequency fault condition is registered, causing a monitor status signal to indicate a failure.

According to another aspect of the invention, the high frequency detection path includes a band-pass filter which passes only the high frequency component. The high frequency component is amplified, then input to the second dual-sided window comparator. In one embodiment distinct thresholds are implemented in the low frequency and high frequency detection paths. By amplifying and filtering the servo-valve error signal the high frequency component amplitude becomes more discernible.

According to another aspect of the invention, the time constant for counting up is smaller than the time constant for counting down in both the first and second up-down counters. As a result, more increments will occur during a given time interval than would decrements for the same time period. This enables a fault condition to be detected when it would not be detected otherwise. It also enables a fault condition to be detected sooner, when it would be detected after a longer time period, otherwise. As the oscillatory servo-valve error signal is tested by a given window comparator, the amplitude of an error signal expressing an oscillatory fault response will pass outside and inside the window during the oscillation period. For the portions outside the window the counter counts up. For the portions within the window the counter counts down. By counting up at a faster rate than counting down, a smaller part of the duty cycle may be outside the window to register a fault. Thus, the window comparator thresholds more closely define the fault amplitude than if counting at the same rate.

According to another aspect of the invention, transient conditions during which the servo-valve error signal is outside the second double-sided window do not result in a failure indication ("nuisance trip"). Because high frequency oscillations are being detected, it is desirable to distinguish high frequency transients from high frequency oscillatory fault conditions. By selecting an appropriate count value, the fault condition must appear for a corresponding time. By selecting appropriate time constants (and thus, count-up and count-down rates), transients having a frequency outside the high frequency range of the second detection path will not generate sufficient up-counts to overcome the down-counts. Thus, a transient is less likely to trigger a fault condition.

According to another aspect of the invention, fault conditions attributable to components within the servo-control system are identified. A position command signal from the pilot or a primary flight computer is input to the servo-control system. The servo-control system includes electronics, a electro-hydraulic servo-valve and an actuator. Drift, bias, mechanical fatigue or other fault conditions in the servo-control system which cause oscillations in the servo-valve error signal are detected.

According to one implementation of this invention, a servo-control system includes an electro-hydraulic valve (EHV) which controls the position of an actuator. The servo-valve is controlled by an inner feedback loop and the actuator is controlled by an outer feedback loop. The actuator feedback signal and servo-valve feedback signal are accessed to monitor the servo-control system. The actuator position feedback signal is summed with the position command to generate an actuator error signal. The actuator error signal is used to predict the servo valve response. The predicted and the actual servo-valve feedback signals then are input to an oscillatory fault monitor according to one embodiment of this invention.

The servo-valve feedback signal is referred to as an "actual" feedback signal. The actuator error signal is input to a servo-valve model to generate a "predicted" servo-valve feedback signal. The "predicted" and "actual" servo-valve feedback signals are summed to generate a servo-valve error signal. The error signal then is checked for low frequency and high frequency fault conditions. Either type of fault condition causes the monitor output to indicate that a fault is present. Action then is taken to correct the fault (e.g., disable the monitored actuator and rely on a redundant actuator).

There are several advantages of the present invention. By detecting high frequency oscillations, a faulty servo-control system can be taken off-line. Thus, the useful lives of the mechanical parts, otherwise exposed to oscillatory fatigue, are extended. Further, the ride quality is improved because the shape of a respective aerodynamic control surface is stabilized. By having independent paths for detecting high frequency and low frequency oscillations, oscillatory faults are quickly identified. The speed of detection is determined by the thresholds for the respective dual-side window comparators and the time constants for the up-down counters. Such values are selected to optimize the monitor response while avoiding nuisance trips.

The invention will be better understood by reference to the following detailed description taken in conjunction with the accompanying drawings.

DESCRIPTION OF SPECIFIC EMBODIMENTS

Servo-Control Loop

Figure 1:
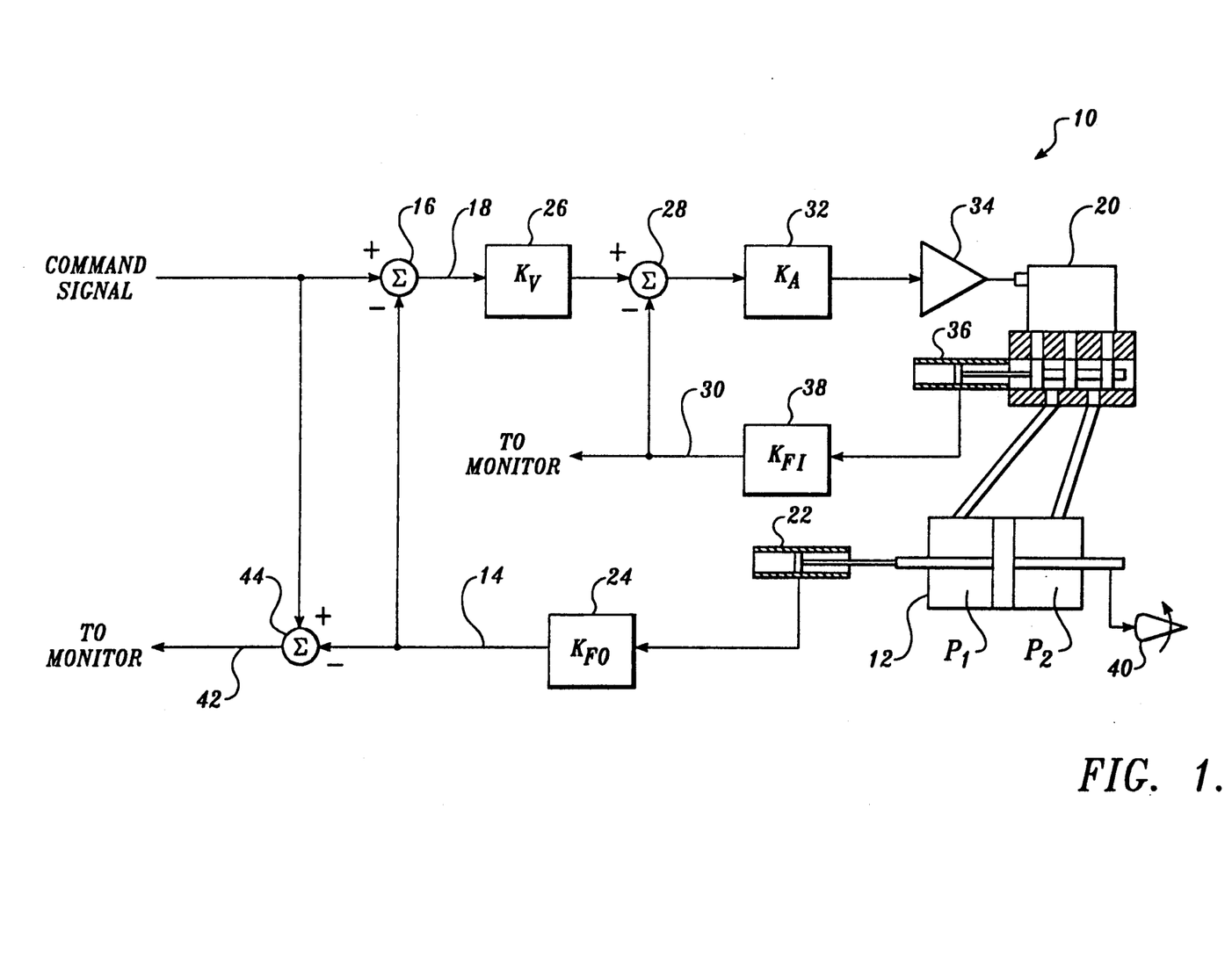
FIG. 1 is a block diagram of a position servo-control system.

FIG. 1 shows a servo-control system 10 for controlling the position of an actuator 12. A command signal defined by a pilot or one of redundant primary flight computers is input to the system 10. Such command signal represents a "desired" actuator position. An "actual" actuator position represented by an actuator feedback signal 14 is subtracted from the desired actuator position at a summing junction 16 to generate an actuator position error signal 18. The position error signal 18 is used to correct the actuator 12 position.

The servo-control system 10 is formed with an outer feedback loop and an inner feedback loop. The outer feedback loop controls the actuator position, while the inner feedback loop controls a servo-valve 20. The servo-valve 20 is coupled to the actuator 12 to control the actuator position. With regard to the outer feedback loop, a first linear variable differential transformer ("LVDT") 22 coupled to the actuator 12 generates an electrical signal representative of the actuator position. The feedback electronics 24 conditions and amplifies the LVDT output. The dc gain of the amplification is $K_{FO}$ (i.e., 4.2 V/inch). The resulting feedback signal is the actuator position feedback signal 14 which is fed into the summing junction 16. The actuator error signal 18 output from the summing junction 16 passes through forward loop electronics 26 having a dc gain, $K_v$ (i.e., 10.7 V/V).

The inner feedback loop receives the amplified actuator error signal at summing junction 28. A servo-valve feedback signal 30 also is input to the junction 28 resulting in a servo-valve error signal. The servo-valve error signal is amplified by an amplifier 32 having a gain $K_a$ (i.e., 1.26 mA/V), then passed through a unity-gain buffer 34 and input to the servo-valve 20 to adjust the servo-valve position. The servo-valve correction results in a correction at the actuator 12. The actuator shown is a pressure differential actuator. The servo-valve 20 varies the pressure differential $P_1$-$P_2$ of the actuator 12 to alter the actuator position. The servo-valve feedback signal is derived from the output of an LVDT 36 coupled to the servo-valve 20. The LVDT 36 generates an electrical signal representative of the servo-valve position. The feedback electronics 38 conditions and amplifies the LVDT 36 output. The dc gain of the amplification is $K_{FI}$ (i.e., 267 V/inch). The result is the servo-valve feedback signal 30 input to the summing junction 28.

According to one implementation, the actuator 12 is linked to an aerodynamic control surface 40 for controlling the displacement of such surface 40 in the vicinity of the actuator 12. By controlling the actuator and surface displacement, the shape of the aerodynamic control surface 40 is controlled. Typically, aircraft include many aerodynamic control surfaces. By controlling the surfaces to define desired surface shapes the attitude of the aircraft is controlled, enabling smooth flight maneuvers.

Typically multiple sets of redundant actuators are used to control the surface shape and provide system reliability. For the actuator 12 of FIG. 1, redundant servo-control systems 10 also are to be included. Redundancy enables continued flight by shutting down an actuator exhibiting a failure or fault, while relying on the redundant servo-control system to position the control surface.

To enable smooth ride quality and prevent unrecoverable damage, it is desireable to detect and correct faults within a prescribed time. For example, performance specifications may require a prescribed detect/correct time of 0.5 seconds. Even faster response may be preferable for optimal ride quality. With regard to the detection function, as fast a detection as feasible without misdiagnosis is desirable. As detection time gets faster, however, non-fault transients inadvertently may be detected as faults. Thus, there is an optimal speed at which transients are not misdiagnosed and detection time is satisfactorily fast.

Fault detection aids in controlling aircraft attitude and improving aircraft ride quality. Faults which might occur in a servo-control system such as shown in FIG. 1 include out of tolerance changes in servo-valve null bias or servo-valve null shift. Faults also might result from feedback sensor errors and forward loop electronics errors. Fault thresholds are selected with consideration for the operating tolerances of each component in the system 10 to avoid misdiagnosis.

Figure 2:
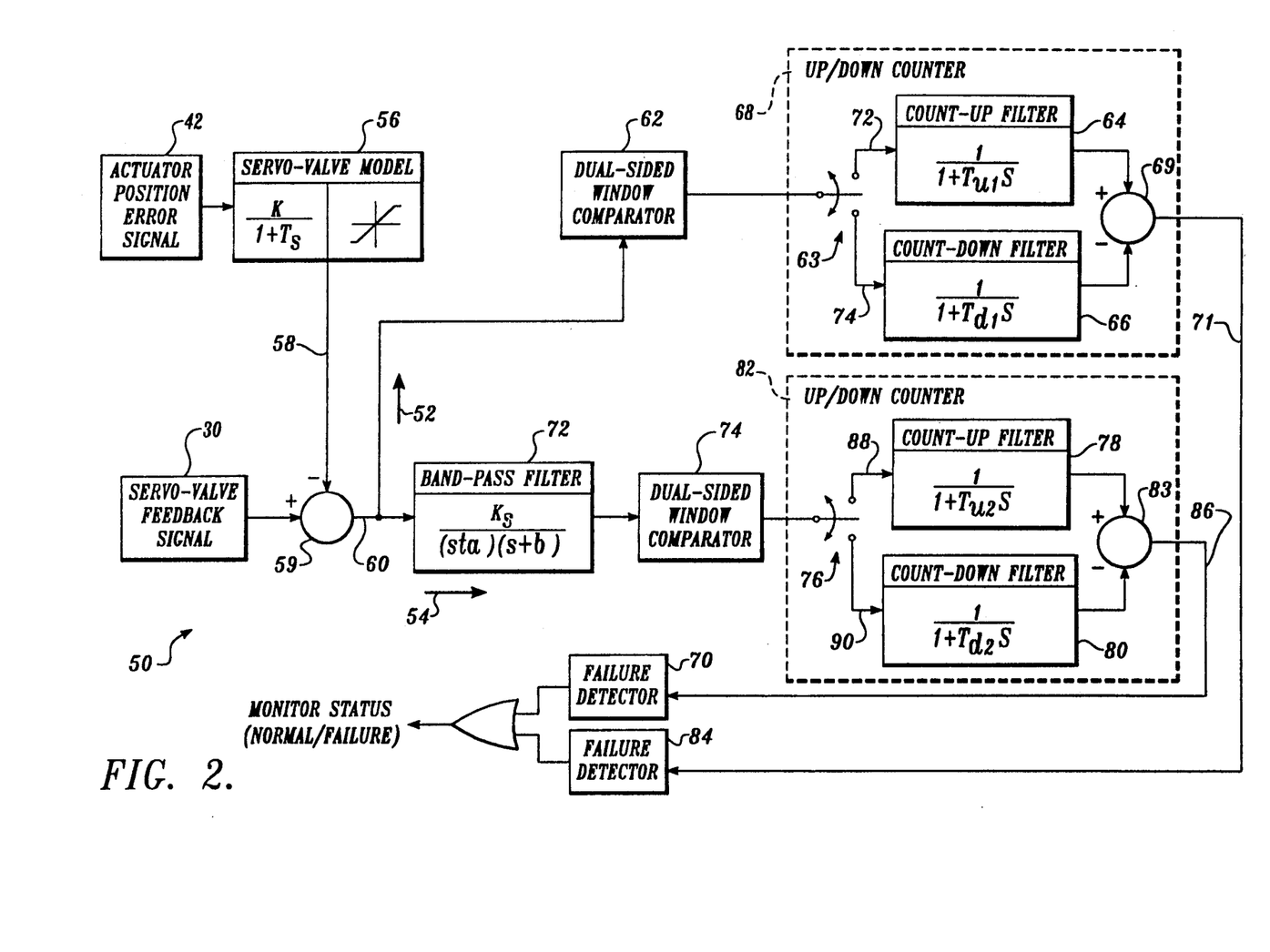
FIG. 2 is a block diagram of an oscillatory fault monitor according to an embodiment of this invention.

To assure that even the faults of the in-path summing junction 16 are detected, an actuator position error signal 42 independently derived from actuator position error signal 18 is input to the monitor (FIG. 2). The error signal 42 is output from a summing junction 44, which receives the command signal and the actuator feedback signal 14. Failures in the summing junction 16 will ripple through into the actuator position feedback signal 14 and appear in the actuator position error signal 42. Errors in any component between and including the summing junctions 16, and servo valve 20 similarly manifest in the error signal 42. The summing junction 44 output 42 as to be described below is input to a servo-valve model to generate a "predicted" servo-valve feedback signal. Such signal will differ from the "actual" servo-valve feedback signal 30 if a fault in any component of system 10 is present.

Although the gains of servo-control system 10 components are shown as dc gains, the gains might more accurately be described with frequency-related transfer functions. Under stable conditions, however, the gains are the dc gains levels shown. For conditions in which system response oscillates, the gain levels may vary. In a worst case scenario, system response may get increasingly unstable. Accordingly, it is desireable to quickly detect fault conditions.

Changes in the response of a given component outside such component's tolerance range are one cause of instability in the servo-control system 10 and are detected as faults. Such instability occurs as an oscillatory response at the actuator 12 and surface displacement of surface 40. For a drift condition, the exhibited oscillations may have a low frequency, near dc level. For other types of faults the oscillation frequency may be higher. Typically, the higher the frequency the lower the oscillation amplitude.

An oscillatory fault monitor according to an embodiment of this invention detects faults exhibiting low frequency or high frequency oscillations as described below.

Oscillatory Fault Monitor Apparatus

FIG. 2 is a block diagram of an oscillatory servo-valve monitor 50 according to an embodiment of this invention. The monitor 50 includes two fault detection paths. A first path 52 detects low frequency fault responses. A second path 54 detects high frequency fault responses. A fault detection at either path 52, 54 results in a failure status output from the monitor 50.

The monitor 50 receives the actuator position error signal 42 and servo-valve feedback signal 30 from the servo-control system 10. As shown in FIG. 1, the actuator position error signal 42 is independently derived from the actuator position error signal 18. The actuator position error signal 42 is input to a servo-valve model 56 which generates a "predicted" servo-valve position signal 58. According to one embodiment, the servo-valve is modeled with a first-order lag filter having a transfer function of $K/(1+T_s)$. An operational value for the dc gain, K, is 12 and for the time constant, $T_s$, is 0.008 seconds.

The "predicted" signal 58 output from servo-valve model 56 is subtracted from the "actual" servo-valve feedback signal 30 at a summing junction 59 to generate a servo-valve error signal 60. The servo-valve error signal 60 is input to both the first "low frequency fault detection" path 52 and the second "high frequency fault detection" path 54. If a fault is detected along either path 52, 54, then the monitor output status is "failure". The servo valve model 56 and junction 59 may be formed with analog circuits as described, but alternatively could be formed with digital components and/or a microprocessor and software.

The first path 52 includes a dual-sided window comparator 62 and an up-down counter 68 and a failure detector circuit 70. In the analog embodiment illustrated, the counter 68 is formed with a count-direction switch 63, a count-up filter 64, a count-down filter 66, and a summing junction 69. The function of the first path circuitry 52 is to detect low frequency oscillatory fault responses. If enough count accumulations (increments) occur causing a count signal 71 to exceed a prescribed level, then a failure is indicated.

The dual-sided window comparator 62 receives the servo-valve error signal 60 and tests whether the amplitude is outside of an amplitude window defined by first and second thresholds. In one embodiment, a steady state error signal has an amplitude of 0 volts, and the first and second thresholds are $+/-2.5$ volts, respectively. If the signal 60 amplitude is outside the range $+/-2.5$ volts, then switch 63 selects path 72 (e.g., count up). If within the range $+/-2.5$ volts, then switch 63 selects path 74 (e.g., count down). The window comparator 62 is formed with voltage comparators and switches in one embodiment, generating two outputs. One output selects the switch 63 position. The other output is the error signal 60 output to one of the paths 72, 74.

The error signal 60 enters either the count-up filter 64 or the count-down filter 66. The count-up filter 64 in one embodiment is a first-order filter having a transfer function of $1/(1+T_{u1}s)$. The count down filter 66 in one embodiment is a first-order filter having a transfer function of $1/(1+T_{d1}s)$. In one application, the up-count time constant, $T_{u1}$, is 0.15 seconds and the down-count time constant, $T_{d1}$, is 0.30 seconds. Summing junction 69 subtracts the count-down filter output amplitude from the count-up filter output amplitude to achieve a count signal 71 (e.g., a difference signal. Such difference signal appears as a staircase waveform (see FIG. 6) in the presence of an oscillatory fault response. When the difference signal 71 reaches a prescribed level (i.e., 3.0 volts) the failure detector circuit 70 (i.e., a comparator) generates a logic output of a given polarity (i.e., "1") designating the monitor status to be "failure". Such failure may appear intermittently as the oscillations vary outside and inside the amplitude window.

The first path circuits 62-70 may be embodied with analog devices as described, or with digital components and/or a microprocessor and software. For example, a sequence of digital samples of error signal 60 may be compared to first and second threshold voltage levels (i.e., $+/-2.5$ v). If a prescribed number of consecutive samples are outside the amplitude window (i.e., $+/-2.5$ v), then a digital up-down counter 68 is incremented. If a prescribed number of consecutive samples are within the amplitude window, then the digital up-down counter 68 is decremented. When the count exceeds a trigger level, fault detector 70 generates an output signifying a "failure" status.

The second path 54 includes a band-pass filter 72, a dual-sided window comparator 74, an up-down counter 82 and a failure detector circuit 84. In the analog embodiment illustrated the counter 82 is formed with a count-direction switch 76, a count-up filter 78, a count-down filter 80, and a summing junction 83. The function of the second path circuitry is to detect high frequency oscillatory fault responses. If enough increments occur causing a count to exceed a prescribed level, then a failure is indicated.

The band-pass filter 72 in one embodiment has a transfer function of $K_sS/[(s+a)(s+b)]$, where $k_s=340$, $a=20$, and $b=340$. With such a transfer function, frequencies within the range of 8 Hz and 50 Hz are passed. Fault responses having oscillations at a frequency within such range are considered herein as high frequency fault responses. For various embodiments, the precise boundary frequencies for the high frequency range may vary.

The dual-sided window comparator 74 receives the filtered component of the servo-valve error signal 60 and tests whether the amplitude is outside an amplitude window defined by third and fourth thresholds. In one embodiment, a steady state error signal has an amplitude of 0 volts, and the third and fourth thresholds are $+/-0.5$ volts, respectively. If the signal 60 amplitude is outside the range $+/-0.5$ volts, then switch 76 selects path 88 (e.g., count up). If within the range $+/-0.5$ volts, then switch 76 selects path 90 (e.g., count down). The window comparator 74 is formed with voltage comparators and switches in one embodiment, generating two outputs. One output selects the switch 76 position. The other output is the error signal 60 output to one of the paths 88, 90.

The filtered error signal 60 enters either the count-up filter 78 or the count-down filter 80. The count-up filter 78 in one embodiment is a first-order filter having a transfer function of $1/(1+T_{u2}s)$. The count-down filter 80 in one embodiment is a first-order filter having a transfer function of $1/(1+T_{d2}s)$. In one application, the up-count time constant, $T_{u2}$, is 0.15 seconds and the down-count time constant, $T_{d2}$, is 0.30 seconds. Summing junction 83 subtracts the count-down filter output amplitude from the count-up filter output amplitude to achieve a count signal 86 (difference signal). Such difference signal appears as a staircase waveform (see FIG. 6) in the presence of an oscillatory fault response. When the difference signal 86 reaches a prescribed level (i.e., 3.0 volts) the failure detector circuit 84 (i.e., a comparator) generates a logic output designating the monitor status to be "failure". Such failure may appear intermittently as the oscillations vary outside and inside the amplitude window.

The second path circuits 72-84 may be embodied with analog devices as described, or with digital components and/or a microprocessor and software. For example, a sequence of digital samples of the filtered error signal 60 may be compared to the third and fourth threshold voltage levels (i.e., $+/-0.5$ v). If a prescribed number of consecutive samples are outside the amplitude window (i.e., $+/-0.5$ v), then a digital up-down counter 82 is incremented. If a prescribed number of consecutive samples are within the amplitude window, then the digital up-down counter 82 is decremented.

The values previously given for the transfer functions, thresholds and time constants apply for a specific embodiment in which an aerodynamic control surface is monitored for oscillations via a derived servo-valve error control signal 60. According to such embodiment, the threshold magnitudes (i.e., $+/-0.5$ v) for the high frequency detection path 54 are less than the threshold magnitudes (i.e., +/−2.5 v) for the low frequency detection path 52. This is because the amplitude for an oscillatory fault response typically decreases as the frequency increases. In some embodiments, the gain applied at the band-pass filter 72 brings the amplitude up to a comparable level so that the same threshold levels apply at both window comparators 62, 74.

Note that the band-pass filter 72 defines the frequency range for the second path 54. The frequency range for the first path 52 may be formed by frequencies less than one boundary frequency of the band-pass filter 72, although some overlap in frequency occurs in other embodiments (in which case both paths signify a fault). The fault detection for the first path 52 is not limited by frequency but by amplitude. Signals present at an amplitude outside the window of comparator 62 for given time periods (0.15 count intervals) may result in faults when sufficient counts are accumulated. In practice, the first path will not register faults for certain high frequency fault responses because the amplitude of the fault does not exceed the thresholds of window comparator 62.

The fault detectors 70, 84 have their respective outputs OR'ed so that a fault detection on either or both paths 52, 54 results in a monitor "failure" status.

Low Frequency Fault Detection

Figure 3:
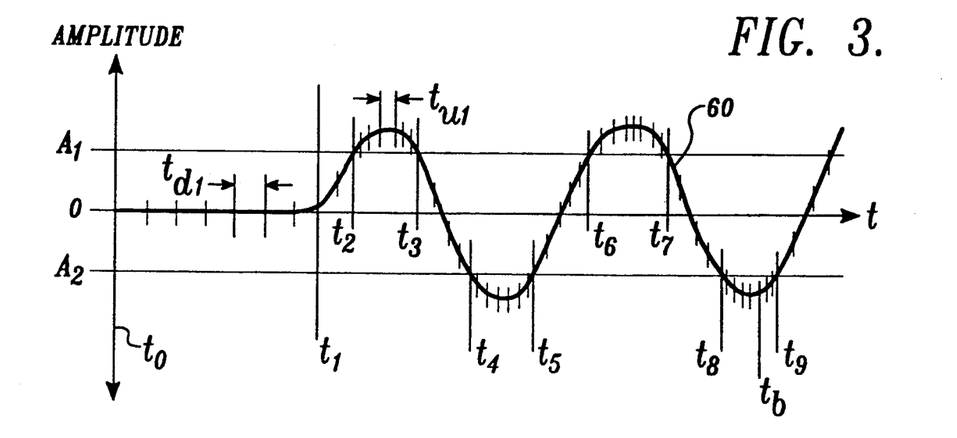
FIG. 3 is a graph of a servo-valve error signal exhibiting a low frequency fault having indications of low frequency up-down counter transitions.

FIG. 3 shows a servo-valve error signal 60 waveform in which low frequency oscillations commence at time $t_1$. The amplitudes $A_1$ and $A_2$ correspond to the first and second amplitude thresholds (i.e., +/−2.5 v) of the first dual-sided window comparator 62. As shown the first threshold $A_1$ is greater than the second threshold $A_2$. The thresholds, in effect, define a window. Such thresholds are prescribed to distinguish low frequency faults from transient spikes. The low frequency range of path 52 is not a prescribed range. In effect, the range is limited by the typical frequencies of fault oscillations in which the amplitudes exceed prescribed first and second thresholds. For the monitor 50 detecting faults in servo-control system 10, a low frequency range is 0 to approximately 8 Hz.

When the signal 60 has an amplitude between the first and second thresholds, the first up-down counter 68 decrements periodically, although not below zero. Thus, for a stable error signal 60 (i.e., between time $t_0$ and $t_1$) the up-down counter 68 eventually achieves a count signal level of zero. When the error signal 60 has an amplitude greater than the first threshold or less than the second threshold, the first up-down counter 68 accumulates (i.e., increments) periodically. When oscillations occur in the error signal 60 (i.e., at time greater than $t_1$) there may be periods during which the signal 60 is within the window and other periods during which the signal 60 is outside the window. Thus, during a portion of the error signal 60 duty cycle, the count signal 71 accumulates and during another portion, the count signal de-accumulates.

The time constant $t_{u1}$ for accumulation is less than the time constant $t_{d1}$ for de-accumulating. Thus, the count-up rate is faster than the count-down rate. Assuming an initial count signal level of zero at time $t_1$ for the example fault response depicted in FIG. 3, a digital counter 68 begins incrementing at time $t_2$ and counts to 8 until time $t_3$. The digital counter 68 then begins decrementing and decrements three times to a count of 5. At time $t_4$ the digital counter 68 begins incrementing again and counts to 13 until time $t_5$. The digital counter 68 then begins decrementing and decrements four times to a count of 9. At time $t_6$ the counter 68 begins incrementing again and counts to 18 until time $t_7$. The digital counter 68 then begins decrementing and decrements three times to a count of 15. At time $t_8$ the digital counter 68 begins incrementing again and counts to 24 until time $t_9$. Upon reaching a prescribed trigger count, the fault detector 84 signifies a "failure" status. For a trigger count of 21, the fault detector 84 triggers the "failure" status at time $t_f$.

High Frequency Fault Detection

Figure 4:
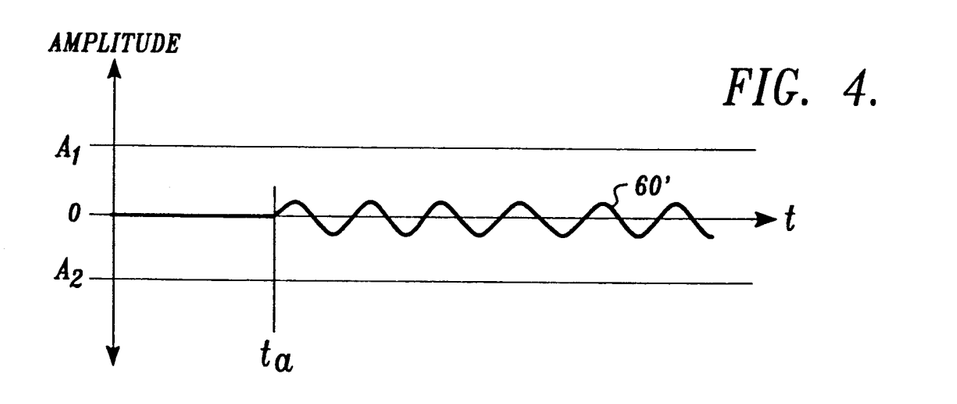
FIG. 4 is a graph of a servo-valve error signal with low frequency detection window comparator thresholds marked, for an error signal exhibiting a high frequency fault.

FIG. 4 shows an error signal 60' waveform. At time $t_a$ high frequency oscillations commence. Along the low frequency detection path 52, the dual-sided window comparator 62 has first and second thresholds A1 and A2. The high frequency oscillations shown in FIG. 4 do not go outside such low frequency path thresholds A1, A2. Thus, the low frequency path 52 does not detect such response as a fault condition. As described below such a signal is detected as a fault along the high frequency fault detection path 54. Note that there are responses in which both the low frequency and high frequency fault detection paths 52, 54 detect a fault. The high frequency range for the path 54 is defined by the band-pass filter 72. A typical high frequency range for monitoring a system 10 is 8–50 Hz.

Figure 5:
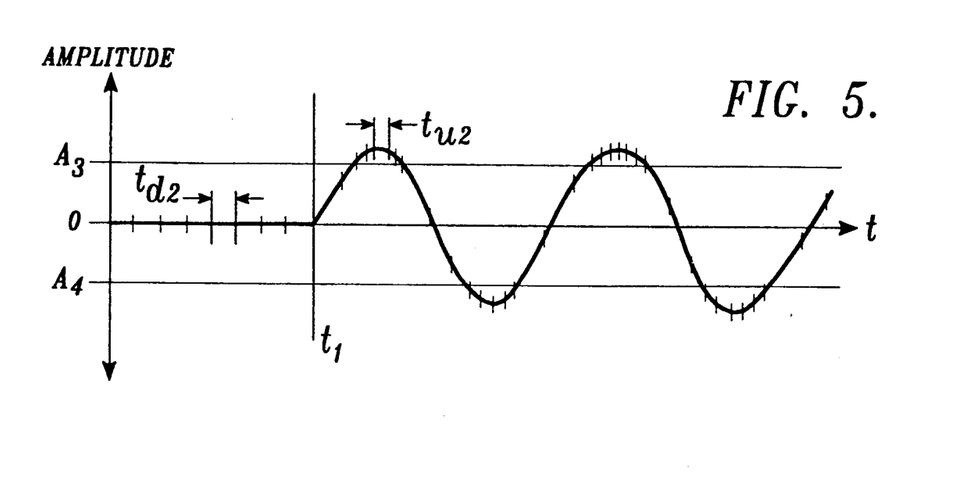
FIG. 5 is a graph of a servo-valve error signal exhibiting a high frequency fault having indications of high frequency up-down counter transitions.

FIG. 5 shows the same servo-valve error signal 60' after being filtered and amplified at path 54. The amplitudes A3 and A4 correspond to the third and fourth thresholds, which correspond to the second dual-sided window comparator 74. As shown the third threshold A3 is greater than the fourth threshold A4. Again, the thresholds define a window. Such thresholds are prescribed to distinguish high frequency faults from transient ringing.

When the signal 60' has an amplitude between the third and fourth thresholds, the second up-down counter 83 decrements periodically, although not below zero. Thus, for a stable error signal 60' (i.e., between time $t'_0$ and $t'_1$) the up-down counter 82 eventually achieves a count of zero. When the signal 60' has an amplitude greater than the third threshold or less than the fourth threshold, the second up-down counter 82 increments periodically. When oscillations occur in the error signal 60' (i.e., time greater than $t'_1$) there may be periods during which the signal 60' is within the window and other periods during which the signal 60' is outside the window. Thus, during a portion of the duty cycle, the second counter 82 counts up and during another portion, the counter 82 counts down.

Thus, the high frequency detection path digital counter 82 operates the same as the low frequency path digital counter 68 discussed above. In alternate embodiments, the up-count time constant and down-count time constant may vary from the respective low frequency path counter time constants because the frequency of the fault response is higher in the high frequency path. Thus, the count-up and count-down rates may be faster for the high frequency detection path 54.

Benefit of $T_u < T_d$

Figure 6:
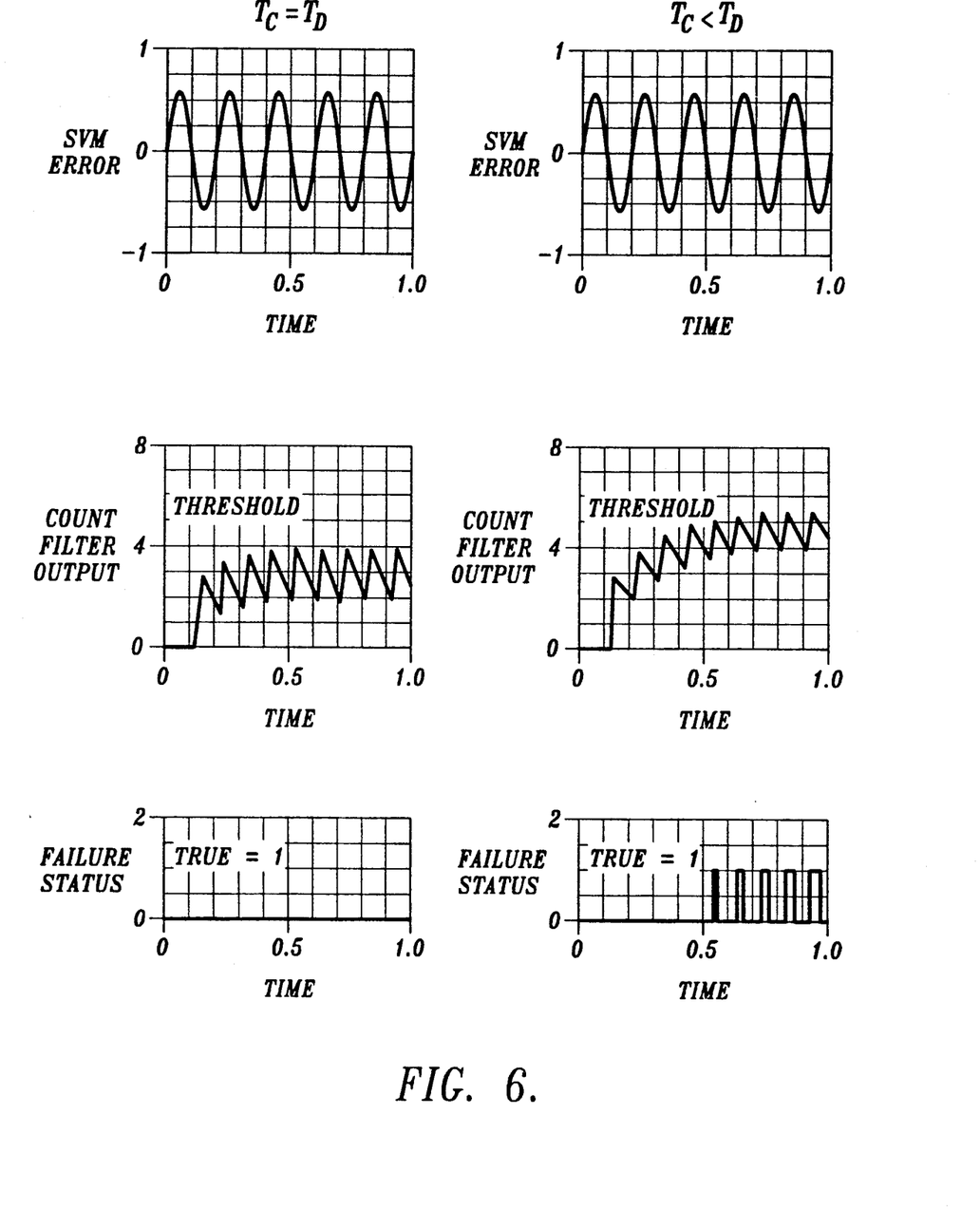
FIG. 6 includes graphs comparing fault detection results for a counter or count filter output in which the count-up time constant is equal to the count-down time constant vs output when the count-up time constant is less than the count-down time constant.

FIG. 6 shows graphs for another error signal 60" for a counter (68,82) having an up-count time constant $T_u$ equal to the down-count time constant $T_d$ and for a counter having the preferable up-count time constant less than the down-count time constant. As illustrated the counter output (digital embodiment) or count filters difference signal (analog embodiment) appears as a staircase waveform. For the equal time constants it takes longer for the output to reach a trigger point. For the example error signal 60" shown, a failure status does not occur for the equal time constants but does occur at several points for the unequal ($t_u < t_d$) time constants.

Thus, by having an up-count time constant less than the down-count time constant, the down-counts do not negate so many up-counts as to prolong detection of a fault. As the peak amplitude caused by a fault increases, the portion of the error signal duty cycle for which the amplitude is outside the window increases. As a result, such faults are detected sooner than faults having a peak amplitude closer to the threshold amplitudes. As the peak amplitude caused by a fault gets closer to the threshold (from the direction outside the window), the portion of the error signal duty cycle for which the amplitude is outside the window decreases. However, because a smaller up-count time constant is used, the error signal amplitude needed to trigger a fault more closely approximates the threshold amplitudes ($A_1$ and $A_2$; $A_3$ and $A_4$), than if equal time constants were used.

Benefit of Independent Low Frequency And High Frequency Detection Paths

By having independent low frequency and high frequency detection paths 52, 54, the amplitude thresholds and counter time constants can be selected to avoid inadvertent nuisance trips, while still detecting high frequency faults. The low frequency path 52 has the amplitude thresholds and time constants selected to optimize low frequency fault detection while avoiding misdiagnosing transient spikes. According to one embodiment, the low frequency counter count-up time constant is 0.15 seconds, while the count-down time constant is 0.30 seconds. For a trigger count of 7, the spike would have to be 0.75 seconds wide to inadvertently trigger a fault.

The high frequency path filters out the low frequency component (including transient spikes), passing only a prescribed high frequency passband. The amplitude thresholds and counter time constants for such high frequency path, thus, are selected to optimize high frequency fault detection while avoiding misdiagnosing transient ringing. According to one embodiment, the high frequency counter up-count time constant is 0.15 seconds, while the down-count time constant is 0.30 seconds. For a ringing transient to be misdiagnosed, there would have to be several periods during which the peak amplitude is outside the window.

Because the monitor 50 is able to detect high frequency faults, the servo-control system expressing such condition may be taken off-line. Thus, the useful lives of the mechanical parts, otherwise exposed to oscillatory fatigue, are extended. Further, the ride quality is improved because the shape of a respective aerodynamic control surface is stabilized. cl Concluding Remarks Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. An apparatus for monitoring a servo-control system to detect oscillations in an error signal, comprising:
   a first detection path receiving the error signal for detecting oscillations of said error signal within a first frequency range; and
   a second detection path receiving the error signal for detecting oscillations of said error signal within a second frequency range;
   said first detection path comprising:
   (a) means for periodically accumulating a first count signal at a first rate while amplitude of said error signal is outside a first amplitude window; and
   (b) means for periodically de-accumulating said first count signal at a second rate while amplitude of said error signal is within said first amplitude window, wherein said first rate is greater than said second rate.

2. The apparatus of claim 1 in which said second detection path comprises:
   (a) means for periodically accumulating a second count signal at a third rate while amplitude of said error signal is outside a second amplitude window;
   (b) means for periodically de-accumulating said second count signal at a fourth rate while amplitude of said error signal is within said second amplitude window, wherein said third rate is greater than said fourth rate.

3. The apparatus of claim 2 in which a fault is identified when said first count signal reaches a first level or said second count signal reaches a second level.

4. The apparatus of claim 2 in which said first amplitude window comprises a first amplitude threshold and a second amplitude threshold, said first amplitude threshold greater than said second amplitude threshold; and in which said second amplitude window comprises a third amplitude threshold and a fourth amplitude threshold, said third amplitude threshold greater than said fourth amplitude threshold.

5. The apparatus of claim 2 in which said second detection path further comprises a band-pass filter receiving said error signal and passing an error signal component within said second frequency range, said error signal component being coupled to said accumulating means and said de-accumulating means.

6. The apparatus of claim 5 in which said second detection path further comprises means for amplifying said passed error signal component, said amplified error signal component being coupled to said accumulating means and said de-accumulating means.

7. The apparatus of claim 1 in which said accumulating means and said de-accumulating means together comprise a digital up-down counting means.

8. The apparatus of claim 1 in which said accumulating means and said de-accumulating means together comprise:
   means for comparing the error signal amplitude to a first threshold amplitude and a second threshold amplitude; and
   digital up-down counting means;
   wherein said counting means periodically increments at said first rate while the error signal amplitude is outside said first amplitude window defined by said first and second amplitude thresholds; and
   wherein said counting means periodically decrements at said second rate while the error signal amplitude is within said first amplitude window, wherein said first rate is greater than said second rate.

9. The apparatus of claim 1 in which said accumulating means comprises a count-up filter and said de-accumulating means comprises a count-down filter and wherein outputs of said count-up filter and count-down filter are combined to define said first count signal.

10. An apparatus for monitoring a servo-control system having an inner feedback loop for controlling a servo-valve and an outer feedback loop for controlling an actuator, the inner loop generating a servo-valve feedback signal, the outer loop generating an actuator position feedback signal, the apparatus detecting oscillations in a servo-valve error signal, the apparatus comprising:

means for generating the servo-valve error signal from said servo-valve feedback signal and said actuator position feedback signal;

a first detection path receiving the servo-valve error signal for detecting oscillations of said servo-valve error signal within a first frequency range; and     a second detection path receiving the servo-valve error signal for detecting oscillations of said servo-valve error signal within a second frequency range;

said first detection path comprising:

(a) means for periodically accumulating a first count signal at a first rate while amplitude of said servo-valve error signal is outside a first amplitude window; and     (b) means for periodically de-accumulating said first count signal at a second rate while amplitude of said servo-valve error signal is within said first amplitude window, wherein said first rate is greater than said second rate.

11. The apparatus of claim 10 in which said second detection path comprises:

(a) means for periodically accumulating a second count signal at a third rate while amplitude of said servo-valve error signal is outside a second amplitude window; and     (b) means for periodically de-accumulating said second count signal at a fourth rate while amplitude of said servo-valve error signal is within said second amplitude window, wherein said third rate is greater than said fourth rate.

12. The apparatus of claim 11 in which a fault is identified when said first count signal reaches a first level or said second count signal reaches a second level.

13. The apparatus Of claim 10 in which the servo-control system receives a desired position command which is compared with the actuator position feedback signal to generate a first actuator position error signal input to said inner loop, wherein said servo-valve feedback signal is an "actual" servo-valve feedback signal, and wherein said servo-valve error signal generating means comprises:

means for independently generating a second actuator position error signal from the desired position command and the actuator position feedback signal;

means receiving the second actuator position error signal for simulating the servo-valve to generate a "predicted" servo-valve feedback signal; and     means for combining said "predicted" servo-valve feedback signal and said "actual" servo-valve feedback signal to generate said servo-valve error signal.

14. A method for monitoring a servo-control system to detect oscillations in an error signal, comprising the steps of:

receiving the error signal at a first detection path for detecting oscillation amplitudes of said error signal within a first amplitude window;

within said first detection path, periodically accumulating a first count signal at a first rate while amplitude of said error signal is outside said first amplitude window;

within said first detection path, periodically de-accumulating said first count signal at a second rate while amplitude of said error signal is within said first amplitude window, wherein said first rate is greater than said second rate;

receiving the error signal at a second detection path for detecting oscillations of said error signal within a second frequency range;

within said second detection path, periodically accumulating a second count signal at a third rate while amplitude of said error signal is outside a second amplitude window; and     within said second detection path, periodically de-accumulating said second count signal at a fourth rate while amplitude of said error signal is within said second amplitude window, wherein said third rate is greater than said fourth rate; and     identifying a fault when said first count signal reaches a first value or said second count signal reaches a second value.

15. The method of claim 14 further comprising the step of filtering the error signal to pass an error signal component within said second frequency range, and wherein said step of accumulating the second count signal is while amplitude of said error signal component is outside said second amplitude window, and said step of de-accumulating said second count signal is while said error signal component is within said second amplitude window.

* * * * *